US005611245A

United States Patent [19]
McKee

[11] Patent Number: 5,611,245
[45] Date of Patent: Mar. 18, 1997

[54] METHOD AND APPARATUS FOR CONTROLLING A POWER TRANSMISSION TO MATCH VEHICLE GROUND SPEED

[75] Inventor: Kevin D. McKee, Naperville, Ill.

[73] Assignee: Case Corporation, Racine, Wis.

[21] Appl. No.: 526,051

[22] Filed: Sep. 8, 1995

[51] Int. Cl.$^6$ .................................................. B60K 41/22
[52] U.S. Cl. ..................................... 74/336 R; 192/3.63
[58] Field of Search ............................ 192/3.63, 3.61; 74/336 R, 335; 477/75

[56] References Cited

U.S. PATENT DOCUMENTS

| | | |
|---|---|---|
| 3,865,209 | 2/1975 | Aihara et al. . |
| 4,425,620 | 1/1984 | Batcheller et al. . |
| 5,007,299 | 4/1991 | Bulgrien . |
| 5,012,416 | 4/1991 | Bulgrien et al. . |
| 5,012,690 | 5/1991 | Bulgrien . |
| 5,036,718 | 8/1991 | Bulgrien . |
| 5,054,591 | 10/1991 | Braun ...................................... 192/3.63 |
| 5,249,658 | 10/1993 | Goeckner et al. . |
| 5,323,669 | 6/1994 | Steeby et al. ......................... 74/336 R |

Primary Examiner—Rodney H. Bonck
Attorney, Agent, or Firm—Foley & Lardner

[57] ABSTRACT

A control system for shifting a vehicle transmission, such as in work vehicles, includes sensors for detecting the output speed of the vehicle engine, the output speed of the transmission and the vehicle ground speed. A controller receives signals from the sensors and command devices and controls engagement and disengagement of combinations of fluid clutches in the transmission to obtain desired gear ratios. The controller implements a ground-speed-matching control routine following operator-induced disengagement and re-engagement signals in which the controller compares the current ground speed to a threshold speed and enters into either a ground-speed-matching sequence or an alternative gear ratio selection sequence depending upon whether the ground speed is higher or lower than the threshold speed. Each routine results in selection of a gear ratio. The selected gear ratio is then limited by the last commanded gear ratio. The gear ratio selected in either the alternative sequence of the ground-speed-matching sequence is then engaged by the controller.

24 Claims, 8 Drawing Sheets

METHOD AND APPARATUS FOR CONTROLLING A POWER TRANSMISSION TO MATCH VEHICLE GROUND SPEED

BACKGROUND OF THE INVENTION

The present invention relates generally to control of a power transmission in a work vehicle such as an agricultural tractor. More particularly, the invention relates to an improved technique for selecting a desired gear ratio in such transmissions based on the ground speed of the vehicle.

In field of transmission systems for work vehicles, such as agricultural tractors, a great number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as an upshift/downshift lever, a forward/reverse lever and the like in the vehicle cab. The control system sends electric signals to hydraulic valves that channel pressurized fluid to the clutches. The control systems thus cause the clutches to engage and disengage in predetermined combinations to smoothly accelerate, decelerate and drive the vehicle as desired by the operator. A transmission and a control system of this type are described in U.S. Pat. No. 4,425,620, issued on Jan. 10, 1984 and assigned to Steiger Tractor, Inc.

Among the many improvements proposed for control systems for work vehicle transmissions, a particularly useful feature is the ability of the control system to select and engage a gear ratio that matches the vehicle ground speed following a period of transmission disengagement. Such periods of disengagement typically occur when the vehicle is moving (i.e. being driven) and the operator depresses a clutch pedal, thereby placing the transmission in neutral while allowing the vehicle to coast. In known ground-speed-matching systems, the transmission controller monitors vehicle ground speed (or transmission output speed) and engine output speed, calculates the ratio of the speeds and selects the transmission gear ratio that most closely matches the speed ratio. When the operator subsequently releases the clutch pedal, the transmission controller engages the combination of clutches required to shift into the ground-speed-matched gear ratio. Transmission control systems employing ground-speed-matching routines of this type are described in U.S. Pat. No. 4,425,620, mentioned above, and U.S. Pat. No. 5,007,299, issued on Apr. 16, 1991 to Bulgrien.

While such ground-speed-matching routines provide a convenient transition between coasting or disengaged operation of the vehicle and subsequent driven operation, they are not without drawbacks. For example, such known transmission control systems generally shift the transmission into the ground-speed-matched gear ratio upon release of the clutch pedal, regardless of the actual magnitude of the ground speed or the speed range represented by the matched gear ratio. That is, whether the vehicle is travelling at relatively fast or slow ground speed, the ground-speed-matched gear ratio is engaged. Moreover, while known transmission control systems may permit an operator to set a maximum allowable gear ratio during certain phases of operation, such as in a constant ground speed mode, such systems generally do not permit an operator to command a gear ratio prior to transmission disengagement and to use the commanded ratio as a limit in the ground-speed-matching routine. As a result, a vehicle operator may inadvertently cause the vehicle to shift into a higher gear than he would have preferred simply by coasting with the clutch pedal depressed and subsequently releasing the clutch pedal, thereby invoking the ground-speed-matching routine.

Therefore, despite the convenience of known ground-speed-matching transmission control systems, there is a need for an improved system for selecting a ground-speed-matched gear ratio for work vehicle transmissions that avoids the drawbacks mentioned above. In particular, there is a need for a ground-speed-matching control system for such transmissions that takes into account the magnitude of the ground speed as well as relative level of the ground-speed-matched gear ratio in selecting the gear to be engaged upon invocation of a ground-speed-matching routine. Moreover, there is a need for a ground-speed-matching control system that selects the gear ratio to be engaged by taking into account the gear ratio selected by the vehicle operator prior to invocation of the matching routine.

SUMMARY OF THE INVENTION

The present invention features a novel transmission control system designed to respond to these needs. The system is particularly suited for transmissions on agricultural tractors, but may be advantageously installed to control other work vehicle transmissions, such as in construction equipment and the like. In its most complete implementation, the system selects a gear ratio by taking into account the vehicle speed as well as the level of the ground-speed-matched gear ratio with respect to a predetermined ratio. In the preferred embodiment described below, the system limits the selected ratio to the ratio commanded by the vehicle operator and in which the vehicle was operating prior to disengagement of the transmission.

The system implements a ground-speed-matching routine as part of an overall transmission control scheme and invokes the routine upon the occurrence of a triggering event, such as when the vehicle operator lifts a clutch pedal from a bottom-of-clutch position. The system calculates the gear ratio most closely matching the speed ratio between the engine output speed and the transmission output shaft speed to determine the ground-speed-matched gear ratio. The system compares the current vehicle speed to a threshold speed and when the triggering event occurs, follows different gear ratio selection routines depending upon whether the vehicle speed is higher or lower than the threshold speed. If the speed is below the threshold, the system selects a gear ratio taking into account whether the ratio commanded before the triggering event was above or below a predetermined ratio. If the speed is above the threshold, the system selects a gear ratio depending upon the relationship between the ground-speed-matched ratio and a predetermined ratio. In both cases, the system limits the gear to be engaged depending upon the ratio commanded before the triggering event.

Thus, in accordance with one aspect of the invention, a control system is provided for a transmission in a work vehicle, such as an agricultural tractor. The vehicle is of the type including an engine and driven wheels and the transmission is coupled between the engine and the driven wheels. The transmission includes a plurality of gears and associated clutches, the clutches being engageable in predetermined combinations by an actuating circuit to define transmission gear ratios between an output speed of the engine and an output speed of the transmission. The control system comprises a speed ratio monitoring circuit, a gear ratio command circuit, a memory circuit and a control circuit. The speed ratio monitoring circuit includes first and second sensors for sensing parameters proportional to vehicle ground speed and to engine output speed, respectively. The gear ratio command circuit includes an operator movable input device for commanding a desired gear ratio. The control circuit engages the commanded gear ratio prior to an operator-induced disengagement event, such as the operator depressing a clutch pedal. In addition, the control circuit generates a command gear signal representative of a gear ratio commanded via the input device. The memory circuit is coupled to the gear ratio command circuit and stores the command gear signal. The control circuit is coupled to the speed ratio monitoring circuit and to the memory circuit and generates a speed ratio signal representative of a ratio between the vehicle ground speed and the engine output speed. The control circuit then compares the speed ratio signal to the predetermined gear ratios and identifies a ground-speed-matched gear ratio most closely matching the speed ratio represented by the speed ratio signal. The control circuit compares the ground-speed-matched gear ratio to the commanded gear ratio and, following an operator-induced re-engagement event, such as the operator releasing a clutch pedal, selects either the ground-speed-matched gear ratio or the commanded gear ratio based upon a predetermined relationship therebetween. Finally, the control circuit generates control signals for engaging clutches corresponding to the selected gear ratio and applies the control signals to the actuating circuit to engage the selected gear ratio.

In accordance with another aspect of the invention, a transmission control system includes a ground speed monitoring circuit, a comparison circuit and a control circuit. The ground speed monitoring circuit detects a parameter proportional to vehicle ground speed and generates a ground speed signal representative thereof. The comparison circuit is coupled to the ground speed monitoring circuit and compares the ground speed represented by the ground speed signal to a predetermined threshold ground speed. The control circuit is coupled to the comparison circuit and to the ground speed monitoring circuit and is configured to select a gear ratio for engaging the transmission in accordance with preset control routines. In particular, the control circuit executes a ground-speed-matching gear selection routine when the ground speed and the threshold ground speed satisfy a predetermined relationship, and executes an alternative gear ratio selection routine when the predetermined relationship is not satisfied. The control circuit selects a gear ratio in either the ground-speed-matching gear selection routine or the alternative gear selection routine, generates control signals for engaging clutches corresponding to the selected gear ratio and applies the control signals to the actuating circuit to engage the selected gear ratio.

In accordance with a further aspect of the invention, a transmission control system includes a speed ratio monitoring circuit, a memory circuit and a control circuit. The speed ratio monitoring circuit includes first and second sensors for sensing parameters proportional to vehicle ground speed and to engine output speed, respectively. The memory circuit stores a predetermined gear ratio signal representative of a predetermined gear ratio. The control circuit is coupled to the speed ratio monitoring circuit and to the memory circuit, the control circuit generates a speed ratio signal representative of a ratio between the vehicle ground speed and the engine output speed, compares the speed ratio signal to predetermined gear ratios and identifies a ground-speed-matched gear ratio most closely matching the speed ratio represented by the speed ratio signal. Moreover, the control circuit compares the ground-speed-matched gear ratio to the predetermined gear ratio and selects either the ground-speed-matched gear ratio or the predetermined gear ratio based upon a predetermined relationship therebetween. Finally, the control circuit generates control signals for engaging clutches corresponding to the selected gear ratio and applies the control signals to the actuating circuit to engage the selected gear ratio.

In accordance with still another aspect of the invention, a method for shifting a work vehicle transmission includes the steps of determining a speed ratio between a parameter proportional to vehicle ground speed and a parameter proportional to engine output speed, and identifying a ground-speed-matched gear ratio most closely matching the speed ratio. The ground-speed-matched gear ratio is then compared to a commanded gear ratio and the ground-speed-matched gear ratio or the commanded gear ratio is selected for transmission engagement based upon a predetermined relationship therebetween. Finally, control signals are generated and applied to a clutch actuating circuit to engage the selected gear ratio. The steps prior to the final step are preferably performed after a control circuit receives an operator induced transmission disengagement signal and step the final step is performed after the control circuit receives an operator induced transmission re-engagement signal. In the preferred embodiment, the ground-speed-matched gear ratio is compared to a predetermined minimum ground-speed-matched gear ratio and is set equal to the minimum ground-speed-matched gear ratio when the minimum ground-speed-matched gear ratio is lower than the ground-speed-matched gear ratio. Moreover, the method may include a further step of comparing vehicle ground speed to a threshold speed and setting ground-speed-matched gear ratio equal to a minimum ground-speed-matched gear ratio when the vehicle ground speed is less than the threshold speed.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
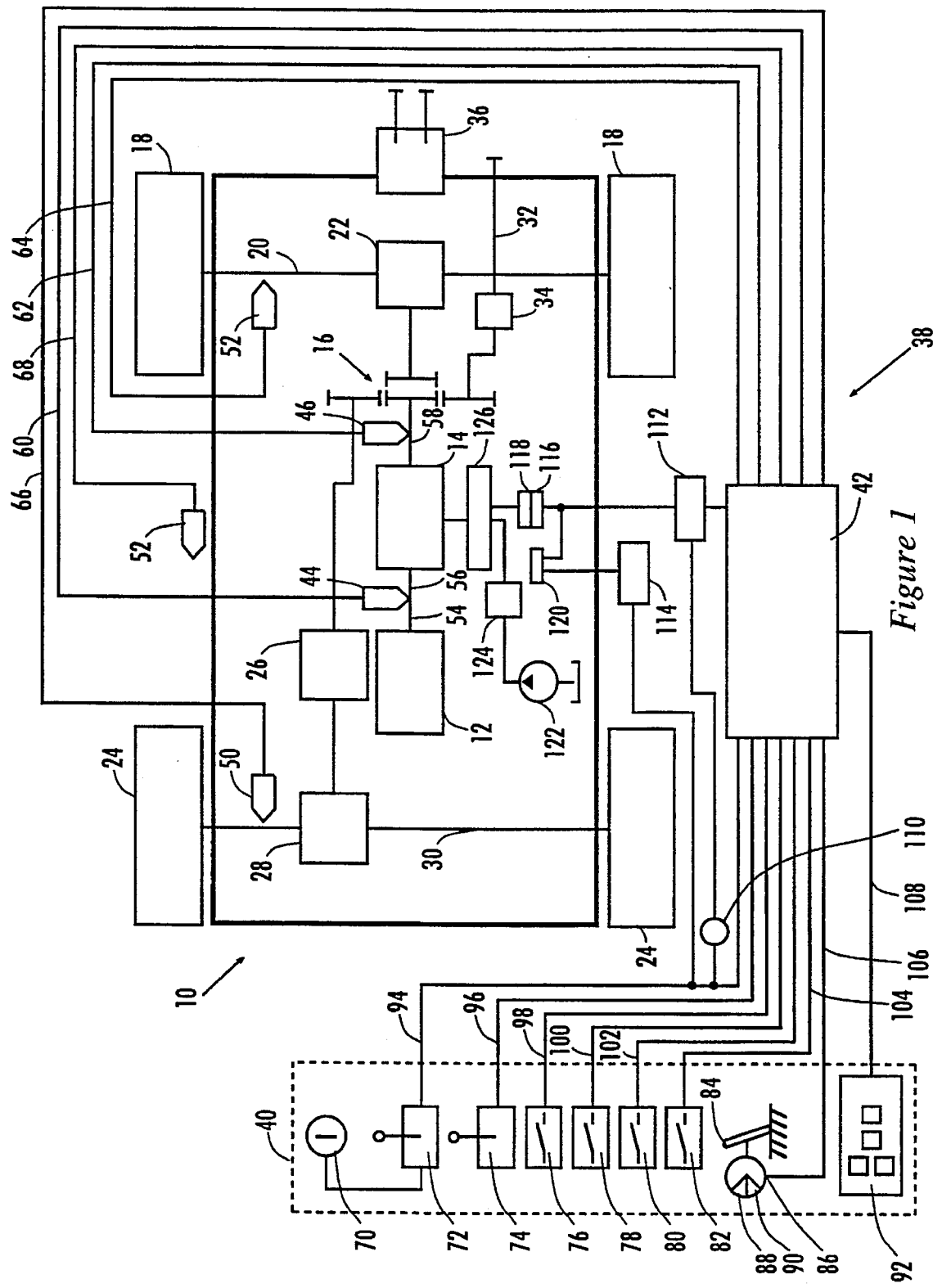
FIG. 1 is a diagrammatical view of a work vehicle incorporating an exemplary transmission control system in accordance with the present invention.

Turning now to the drawings and referring to FIG. 1, a vehicle, such as an agricultural tractor, designated by the reference numeral 10, includes an engine 12 mechanically coupled to a transmission 14. Transmission 14 selectively drives gearing, designated generally the reference numeral 16, at various gear ratios as commanded by an operator and controlled by a controller as described below. Gearing 16 drives rear wheels 18 mounted on a rear axle 20 through a rear differential 22. Gearing 16 preferably also permits transmission 14 to drive front wheels 24 through a front wheel drive engagement system 26, front differential 28 and front axle 30. Gearing 16, differentials 22 and 28 and front wheel drive engagement system 26 may be of generally known construction. Gearing 16 is also coupled to a power take off shaft 32 through a power take off clutch 34 for driving various implements (not shown) which may be coupled to vehicle 10, such as on a hitch assembly 36.

The operation of transmission 14 is controlled by a control system, indicated generally by the reference numeral 38. Control system 38 includes operator command devices in an operator station 40, typically located in a covered vehicle cab (not shown). Control system 38 also includes a transmission controller 42 coupled to operator station 40 and to instrumentation and control circuitry as described below.

As schematically illustrated in FIG. 1, instrumentation for control system 38 preferably includes speed sensors 44, 46, 48, 50 and a ground speed sensor 52. Speed sensor 44 is associated with an engine output shaft 54 linking engine 12 to transmission 14, or with a transmission input shaft 56 coupled to shaft 54. Speed sensor 46 is associated with a transmission output shaft 58. Speed sensors 44 and 46 may be of any suitable type, such as a magnetic proximity sensor associated with a toothed timing gear (not shown), as are well known in the art. Sensors 44 and 46 produce electrical signals representative of the rotational speed of shafts 54 (or 56) and 58, respectively, and apply these speed signals to transmission controller 42 through data communication lines 60 and 62, respectively. Speed sensors 48 and 50, which may be substantially identical to speed sensors 44 and 46, are associated with rear axle 20 and front axle 30, respectively. Sensors 48 and 50 produce electrical signals representative of the rotational speed of axles 20 and 30, and apply these signals to transmission controller 42 via communication lines 64 and 66, respectively. Ground speed sensor 52 preferably includes a radar emitter and receiver unit of generally known construction and is secured on vehicle 10, directed generally downwardly. Ground speed sensor 52 produces an electrical signal representative of the vehicle ground speed and applies this signal to transmission controller 42 via a communication line 68.

The signals produced by sensors 44, 46, 48, 50 and 52 are used as control inputs by controller 42 as described below. It should be noted that in appropriate situations, control system 10 may include more or fewer speed sensors, such as where the signals produced by one or more of sensors 44, 46, 48, 50 and 52 are redundant, or where a signal representative of the parameter sensed by a particular sensor is available from an alternative source. For example, as described below, ground speed sensor 52 provides an indication of the ground speed of vehicle 10. However, where front axle 30 is not positively driven by engine 12, the output of speed sensor 50 may be used for this purpose, or speed sensor 50 may be eliminated from the system and only ground speed sensor 52 used for the ground speed-related signal.

In the preferred embodiment illustrated, operator station 40 includes a key switch 70, a forward-neutral-reverse-park (FNRP) selection lever 72, a gear ratio increment and decrement, or "bump" lever 74, an automatic/manual selection switch 76, a diagnostic request switch 78 and a creeper switch 80. System 38 may include switches for additional operator commanded inputs, as indicated by the reference numeral 82. The interconnections between these components and transmission controller 42 are described in greater detail below. Generally however, key switch 70 permits an operator to selectively enable and completely disable the operation of vehicle 10 and transmission 14. FNRP lever 72 may be placed in four stable positions, including "forward," "reverse," "neutral" and "park," and permits an operator to selectively command controller 42 to shift transmission 14 into various forward, reverse and neutral gear ratios for driving vehicle 10 in a desired direction of travel and at desired speeds, as well as to lock transmission 14 in a "parked" configuration discussed below. Bump lever 74 allows the operator to increment or decrement the selected gear ratio and to preselect forward and reverse gear ratios to which transmission 14 will be shifted. Selection switch 76 permits the operator to override certain automatic control functions of controller 42 described below. Creeper switch 80 allows the operator to selectively engage an extremely low range of gear ratios where corresponding creeper gearing and a creeper clutch are provided in transmission 14 as described below.

Operator station 40 also includes a clutch pedal 84 coupled to a position sensor 86, and top-of-clutch and bottom-of-clutch switches 88 and 90, respectively. Movement of clutch pedal 84, as sensed by position sensor 86 and switches 88 and 90, permits a vehicle operator to regulate certain control functions of controller 42 as described below. Position sensor 86 may be of any suitable type, such as a rotary or linear potentiometer, which generates a signal representative of the position of clutch pedal 84. Top-of-clutch switch 88 and bottom-of-clutch switch 90 are two-position switches that provide signals to controller 42 indicating when clutch pedal 84 is in its fully raised and fully depressed positions, respectively. In addition, operator station 40 includes a visual display 92 for providing an operator with information relating to the state of transmission 14 (e.g. direction and level of selected gears, diagnostic codes, and the like).

Levers 72 and 74, and switches 76, 78, 80 and 82 are linked to transmission controller 72 via communication lines 94, 96, 98, 100, 102 and 104, respectively, and apply operator-induced command signals to controller 72 through their respective communication lines. Sensor 86, and top and bottom of clutch switches 88 and 90 are similarly linked to controller 72 via one or more communication lines 106. Display 92 receives data from controller 42 via a similar communication line 108, typically in the form of a conductor bundle or instrumentation harness.

As illustrated schematically in FIG. 1, in addition to supplying command signals to controller 42, FNRP lever 72 is coupled to controller 42 through a neutral relay circuit 110 and a neutral latch circuit 112 for selectively placing and maintaining transmission 14 in a neutral condition. Moreover, FNRP lever 72 is also coupled to a limp home relay circuit 114 for selectively permitting vehicle 10 to be placed in preselected limp home gear ratios in the event of a system failure. The preferred structure and function of relay circuits 110, 112 and 114 will be described in greater detail below. Neutral latch relay circuit 112, a park switch (described below) and controller 42 are coupled to a plug connector 116 through which controller 42 provides control signals for regulating the operation of transmission 14. In normal operation, plug connector 116 is joined to a mating connector 118, whereas the latter mating connector 118 may be coupled to a limp home plug connector 120 for providing alternative circuitry paths ensuring limited transmission operation in the event of system failure as described below.

At the direction of control signals from controller 42, communicated through plug connectors 116 and 118, transmission 14 may be engaged in several distinct gear ratios via a hydraulic circuit that includes a fluid pump 122, fluid conditioning valving 124 and directional control valving 126. Pump 122 may be of any suitable type, such as a hydraulic gear pump, and will typically be coupled to engine 12 for pressurizing hydraulic for use in engaging selected clutches of transmission 14. Fluid conditioning valving 124 typically includes a pressure relief valve (not shown) for limiting system pressure, as well as appropriate pressure regulating valves as are well known in the art. Directional control valving 126 includes a bank of spring-biased, two-position, three-way valves of known construction, plumbed to receive pressurized fluid from valving 124 and to selectively direct the fluid to transmission 14. Each directional control valve in valving 126 includes a solenoid which may be energized by a control signal from controller 42 to shift the associated valve from a closed position to an open position to actuate or engage a fluid clutch within transmission 14.

Figure 2:
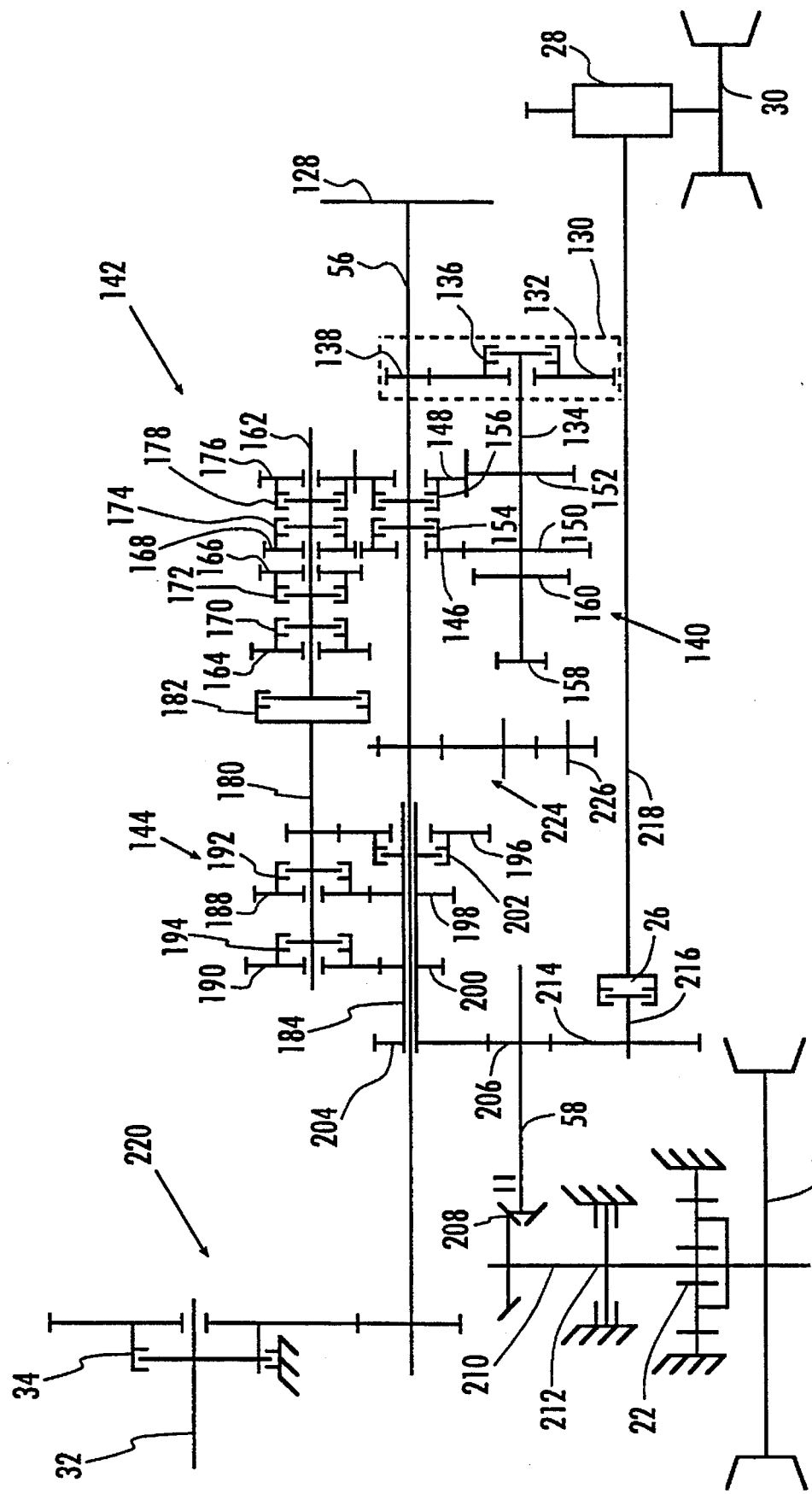
FIG. 2 is a diagrammatical view of a vehicle transmission of the type controlled by the system illustrated in FIG. 1.

Turning more particularly to the structure and operation of transmission 14, while any one of a variety of transmissions may be controlled by control system 38, FIG. 2 illustrates diagrammatically the presently preferred configuration. Transmission 14 is of a type known generally as a "powershift transmission," wherein several sets of gears are associated with transmission shafts and certain of the gears may be selectively rotationally fixed with respect to their shafts by engagement of an associated fluid clutch to define desired gear ratios between input shaft 56 and output shaft 58. In the transmission illustrated in FIG. 2, an engine drive plate 128 is driven in rotation by the vehicle engine. Drive plate 128 is coupled to transmission input shaft 56 and powers drive shaft 56 in rotation. Gear sets, along with associated fluid clutches and transmission shafts permit a number of different gear ratio combinations to be defined for driving transmission output shaft 58 at desired speeds as follows.

A creeper gear set 130 includes a creeper gear 132 mounted on and rotational with respect to a second transmission shaft 134. A creeper clutch 136 is engageable to lock creeper gear 132 against rotation on shaft 134. Creeper gear set 130 also includes a gear 138 fixed to shaft 56 and continuously meshing with creeper gear 132. Engagement of creeper clutch 136 results in driving shaft 134 through gears 138 and 132 to obtain an extremely slow output speed of shaft 58. Creeper gear set 130 may be optionally excluded from transmission 14.

Transmission 14 includes three groups of gear sets, identified in FIG. 2 by the reference numerals 140, 142 and 144. First group 140 includes first and second gears 146 and 148 supported on and rotational with respect to shaft 56. Additional gears 150 and 152, fixed on second shaft 134 mesh continuously with gears 146 and 148, respectively. Fluid clutches 154 and 156 are associated with gears 146 and 148, respectively, and may be engaged to lock their associated gear against rotation on shaft 56. In operation, either clutch 154 or clutch 156 is engaged to obtain an input-to-output gear ratio, or both clutches may be released or disengaged to interrupt the transmission of power to shaft 134. In the preferred embodiment shown, gear combination 146 and 150 define a ratio 34:39, while gears 148 and 152 have a ratio of 37:37.

Second gear set group 142 includes gear 150, as well as to additional gears 158 and 160, all fixed on second shaft 134. Supported on a third transmission shaft 162 and rotational with respect to third shaft 162, three gears 164, 166 and 168 mesh continuously with gears 158, 160 and 152, respectively. Fluid clutches 170, 172 and 174 are associated with gears 164, 166 and 168, respectively, and may be engaged to lock the associated gear against rotation on shaft 162. Thus, either one of clutches 170, 172 or 174 may be engaged to transmit power between second shaft 134 and third shaft 162, or all of the clutches may be released to interrupt power transmission between the shafts. In the preferred embodiment illustrated, gear combination 158 and 164 provide a gear ratio of 29:44, combination 160 and 166 provide a ratio of 34:39, and combination 150 and 168 provide a ratio of 39:34.

A reverse gear set is provided adjacent to second gear set group 142 on shaft 162, and includes a reverse gear 176 mounted on and rotational about shaft 162. A reverse clutch 178 is associated with reverse gear 176 and may be engaged to lock reverse gear against rotation with respect to shaft 162, placing transmission 14 in one of several reverse gear ratios.

Third shaft 162 is aligned with and may be selectively coupled to a fourth transmission shaft 180 via a master clutch 182. Thus, when master clutch 182 is fully engaged, shaft 180 rotates at the same speed and in the same direction as shaft 162. As discussed below, master clutch 182 is preferably modulated into and out of engagement, such as by pulse-width-modulating a proportional directional control valve (not shown) included in valving 126. However, master clutch 182 may be mechanically or electro-mechanically modulated by techniques well known in the art.

Third gear set group 144 selective couples shaft 180 with a further shaft 184 disposed about shaft 56. Third gear set group 144 includes a first gear 186 fixed to shaft 180, and a pair of gears 188 and 190 supported on and rotational with respect to shaft 180. Clutches 192 and 194 are associated with gears 188 and 190, respectively, and may be engaged to lock the associated gear against rotation on shaft 180. Gears 186, 188 and 190 mesh continuously with corresponding gears 196, 198 and 200, respectively, on shaft 184. Gear 196 is supported on and rotational with respect to shaft 184, whereas gears 198 and 200 are fixed to shaft 184. A fluid clutch 202 is associated with gear 196 and may be engaged to lock gear 196 against rotation on shaft 184. Thus, by selectively engaging either clutch 192, 194 or 202, shaft 184 is caused to rotate at a predetermined speed ratio as shaft 180 is driven in rotation. In the presently preferred embodiment, gear combination 186 and 196 provide a gear ratio of 22:54, combination 188 and 198 provide a ratio of 37:39, and combination 190 and 200 provide a ratio of 52:24.

Shaft 184 transmits power to transmission output shaft 58 through gears 204 and 206, fixed on shafts 184 and 58 respectively and arranged to continuously mesh with one another. As illustrated in FIG. 2, output shaft 58 transmits power to rear axle 20 through bevel gears 208 arranged to drive a differential input shaft 210. A master brake 212 is provided on shaft 210 for braking vehicle 10. In addition to driving rear axle 20, in the preferred embodiment illustrated in FIG. 2, gear 206 carried by output shaft 58 meshes with a further gear 214 supported on a front wheel drive clutch shaft 216. A front wheel drive shaft 218 may be selectively coupled to clutch shaft 216 by front wheel drive clutch 26, and extends to front wheel drive differential 28 for driving front axle 30.

In addition to the gearing described above, transmission 14 is preferably arranged for driving power take off shaft 32 via power take off gearing 220, including power take off clutch 34. Transmission 14 also includes gearing, designated generally by the reference numeral 224, for driving a pump drive shaft 226.

All of the clutches contained in transmission 14 are preferably fluid clutches of a type well known in the art. Such clutches are typically biased in a disengaged position and engageable by the application of pressurized fluid. Moreover, while clutches 154, 156, 170, 172, 174, 178, 192, 194 and 202 may be modulated into and out of engagement, such as by gradually shifting a proportional hydraulic valve in valving 126, in the presently preferred embodiment, these clutches are engaged by hydraulic valves that are shifted directly between pressure transmitting and pressure relieving positions. However, to permit smooth transitions in shifting, master clutch 182 is preferably modulated into and out of engagement by pulse width modulating a proportional directional control valve in valving 126. Thus, direct shifting between selected gears, commonly known in the art as power shifting, may be performed by disengaging outgoing clutches (corresponding to the gear ratio being shifted from) while engaging incoming clutches (for the gear ratio being shifted to), in a coordinated and timed manner with master clutch 182 engaged. In appropriate situations where transmission 14 is to be shifted over a broad range of gear ratios, certain intermediate gear ratios may be skipped, in accordance with a technique well known in the art as "skip shifting." On the other hand, modulated shifting may be commanded by fully engaging clutches corresponding to a desired gear ratio with master clutch 182 disengaged, then modulating engagement of master clutch 182. Such modulated shifting is extremely useful in certain shifting situations, such as starting from a stop and shuttle shifting between forward and reverse gear ratios.

In the presently preferred embodiment, controller 42 may command all of these types of shifting depending upon the operating conditions of transmission 14. Techniques for power shifting, skip shifting and modulated shuttle shifting are well known in the art. By way of example, such techniques are described in U.S. Pat. No. 4,967,385, issued on Oct. 30, 1990 to Brekkestran et al. and assigned to J. I. Case Company, which is hereby incorporated herein by reference. As will be appreciated by those skilled in the art, transmission 14 may execute power shifts and skip shifts both while upshifting to higher gear ratios in the same direction and while downshifting to lower gear ratios in the same direction. Similarly, transmission 14 may execute modulated shuttle shifts both from forward gear ratios to reverse gear ratios and vice versa.

By engaging combinations of clutches, transmission 14 establishes a number of predetermined gear ratios between input shaft 56 and output shaft 58. In particular, for the transmission illustrated in FIG. 2, the following gear ratios are provided (the prefixes F, R, C and CR representing forward, reverse, forward creeper and reverse creeper gear ratios, respectively):

| Gear ratio | Clutches engaged |
| --- | --- |
| F1 | 154, 170, 202 |
| F2 | 156, 170, 202; |
| F3 | 154, 170, 202; |
| F4 | 156, 172, 202; |
| F5 | 154, 172, 202; |
| F6 | 156, 174, 202; |
| F7 | 154, 170, 192; |
| F8 | 156, 170, 192; |
| F9 | 154, 172, 192; |
| F10 | 156, 172, 192; |
| F11 | 154, 174, 192; |
| F12 | 156, 174, 192; |
| F13 | 154, 170, 194; |
| F14 | 156, 170, 194; |
| F15 | 154, 172, 194; |
| F16 | 156, 172, 194; |
| F17 | 154, 174, 194; |
| F18 | 156, 174, 194; |
| R1 | 154, 178, 202; |
| R2 | 156, 178, 202; |
| R3 | 154, 178, 192; |
| R4 | 156, 178, 192; |
| C1 | 136, 170, 202; |
| C2 | 136, 172, 202; |
| C3 | 136, 174, 202; |
| C4 | 136, 170, 192; |
| C5 | 136, 172, 192; |
| C6 | 136, 174, 192; |
| CR1 | 136, 178, 202; |
| CR2 | 136, 178, 192. |

It should be noted that for forward gear ratios, only one clutch of each gear set group 140, 142 and 144 is engaged. Similarly, for reverse gear ratios, the reverse gear clutch 178 is engaged along with a clutch from the first and third gear set groups 140 and 144. Moreover, for creeper gear ratios, the creeper clutch 136 is engaged along with a clutch from the second gear set group 142 (or the reverse gear clutch 178) and a clutch from the third gear set group 144. As mentioned above, all gear combinations require engagement of master clutch 182 for transmission of power through transmission 14.

Figure 3:
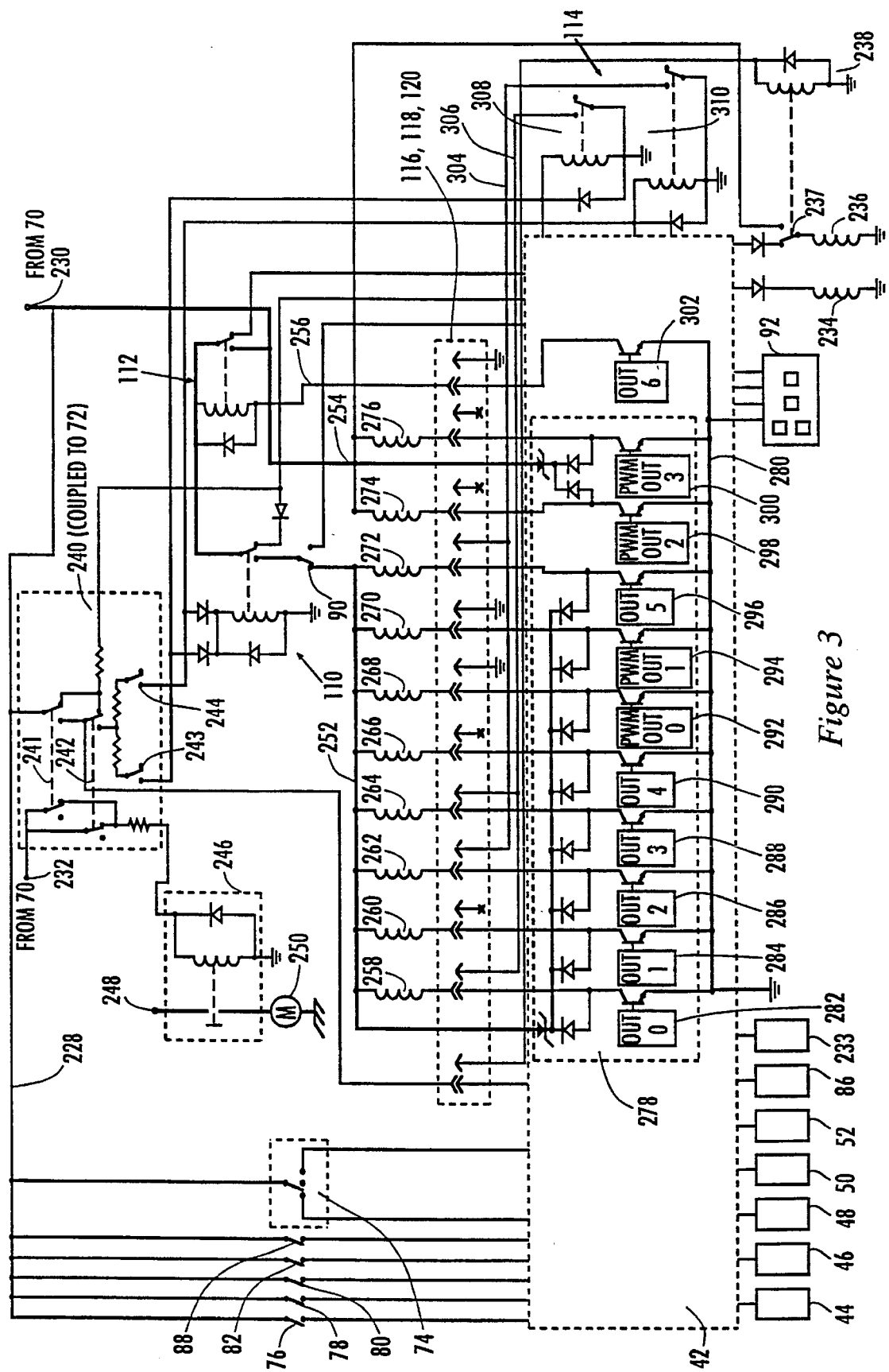
FIG. 3 is a schematic diagram of a presently preferred embodiment of a control system in accordance with the invention.
Figure 4:
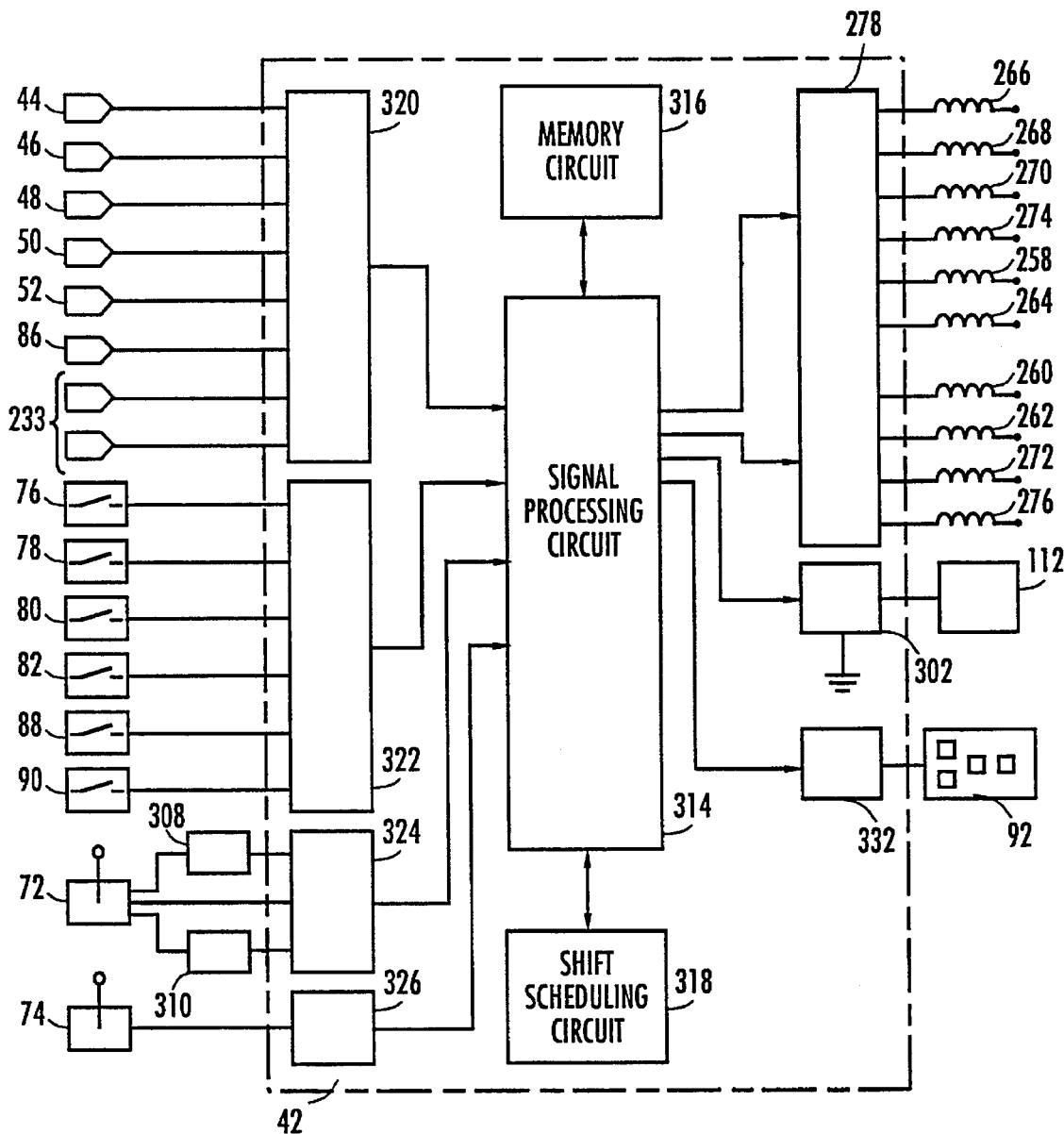
FIG. 4 is a block diagram illustrating certain functional circuitry included in the control system of FIG. 1.

In the presently preferred embodiment of control system 38, controller 42 includes a programmed digital microprocessor, memory circuitry and interface and signal conditioning circuitry for receiving input signals from the sensors and command devices discussed above and for applying control signals to directional control valving 126 coupled to transmission 14. FIG. 3 illustrates the presently preferred arrangement and interconnection between the various components of control system 38, while FIG. 4 shows the flow of certain key signals in the system between functional circuitry included in controller 42. Turning first to FIG. 3, a voltage supply line 228 is indicated as coupled to a lead 230 from key switch 70. Lead 230 couples line 228 to a source of electrical power (i.e. the electrical system of vehicle 10), when key switch 70 is placed in a "run" position. Key switch 70 is also coupled to a second lead 232 which receives electrical power when key switch 70 is placed in a "start" position. As shown in FIG. 3, auto/manual switch 76, diagnostic switch 78, creeper switch 80, additional switches 82 and top-of-clutch switch 88 are coupled between power line 228 and controller 42. Thus, when each switch is closed, a corresponding power signal is applied to an input of controller 42. Bump lever 74 is similarly coupled between power line 228 and controller 42. Bump lever 74 is biased in a center or neutral position in which it applies no signal to controller 42, and is movable to increment and decrement positions in which corresponding increment and decrement signals are applied to controller 42. Also as illustrated in FIG. 3, sensors 44, 46, 48, 50 52 and 86 are coupled to inputs of controller 42, whereas display 92 is coupled to outputs of controller 42. Controller 42 may include other inputs for additional sensors, designated generally at 223 in FIG. 3, such as transmission oil temperature sensors, pressure sensors and the like.

It should be noted that, while the various sensors and command devices discussed above are shown and described as dedicated devices included in control system 38 and coupled directly to controller 42, where vehicle 10 includes similar or redundant devices as part of other on-board control systems, controller 42 may be coupled to a data bus or similar data sharing circuit and obtain signals for control of transmission 14 as required from the data bus. Similarly, signals generated by sensors and command devices included in control system 38 may be shared by other on-board control systems via a data bus.

As shown in FIG. 3, control system 38 includes a creeper solenoid coil 234 coupled to an output of controller 42 for shifting a hydraulic directional control valve in valving 126 for directing pressurized fluid to creeper clutch 136. In addition, a park solenoid coil 236 is coupled to an additional output of controller 42 through a park contact 237 opened and closed by a limp home park relay circuit 238. Park solenoid coil 236 may be energized by controller 42 or by operation of limp home park relay circuit 238 as described below.

An FNRP circuit 240 is electrically coupled to power supply line 228 and to lead 232, and mechanically coupled to FNRP lever 72. FNRP circuit 240 includes a park switch 241, a neutral switch 242, a forward switch 243 and a reverse switch 244. Park switch 241 receives power from supply line 228, as does neutral switch 242. Park switch 241 is closed by placing lever 72 in its "park" position. Park switch 241 and neutral switch 242 are, in turn, coupled to a starter relay circuit 246 and to neutral latch circuit 112 as shown in FIG. 3 for preventing vehicle 10 from starting in a condition in which vehicle 10 may inadvertently move due to gear engagement as described below. When FNRP lever 72 is moved into its "neutral" position, neutral switch 242 is closed, while forward and reverse switches 243 and 244 are open. When FNRP lever 72 is then moved to a "forward" or "reverse" position, neutral switch 242 is opened and the corresponding forward or reverse switch 243 or 244 closed.

Starter relay circuit 246 is coupled to a power source, such as to the vehicle electrical system, through a lead 248. Lead 248 delivers an energizing signal to the vehicle starter 250, but may do so only when relay circuit 246 closes a connection between lead 248 and starter 250. Relay circuit 246 is powered only when park switch 241 or neutral switch 242 is closed (i.e. when FNRP lever 72 is in its "park" or its "neutral" position). Thus, park switch 241, neutral switch 242 and starter relay circuit 246 interrupt power to starter 250 when FNRP lever 72 is its "forward" or "reverse" positions, thereby preventing starter 250 from being energized through normal means (i.e. by turning key switch 70 to its "start" position) unless transmission 14 is placed in a neutral or parked condition (i.e. disengaged).

Neutral latch circuit 112 and neutral relay circuit 110 are arranged to provide power to drive directional control valving 126 via power supply lines 252 and 254 as follows. Neutral latch circuit 112 includes a relay coil coupled to controller 42 through a ground connection 256. In normal operation, controller 42 grounds neutral latch circuit 112 to enable its energization. As discussed below, controller 42 may interrupt this ground connection to disable or unlatch circuit 112 when desired. In FIG. 3, neutral latch circuit 112 is illustrated in its unlatched or open position, wherein neutral latch circuit 112 permits no power to flow from supply line 228 to supply line 252. However, when FNRP lever 72 is placed in a neutral position, closing neutral switch 242, power is allowed to flow through neutral latch circuit 112 to ground through controller 42, thereby energizing the coil of neutral latch 112, closing the relay. Because power then flows to the relay coil from supply line 228, the relay remains latched. Neutral latch circuit 112 thus disables transmission 14 unless and until FNRP lever 72 is placed in a neutral position and key switch 70 is moved to its "run" position. Once these two criteria are satisfied, latch 112 remains energized until key switch 70 is moved out of its "run" position or until controller 42 interrupts ground connection 256.

Neutral relay circuit 110 is coupled between neutral latch circuit 112 and supply line 252. Neutral relay circuit 110 is enabled upon energization of neutral latch relay 112, and itself is energized when either forward switch 243 or reverse switch 244 is closed by moving FNRP lever 72 to its forward or reverse position. When either switch 243 or 244 is thus closed, the coil of relay circuit 110 is energized, drawing the relay closed and providing power to supply line 252. Subsequently, when FNRP lever 72 is moved to its neutral position, opening both forward and reverse switches 243 and 244, power is interrupted to neutral relay circuit 110, causing the relay to open and interrupting power to supply line 252. Neutral relay circuit thus disables transmission 14 by interrupting power to valving 126 when FNRP lever 72 is placed in a neutral position. It should be noted that bottom-of-clutch switch 90 also is located in series between neutral relay 110 and supply line 252. When an operator depresses clutch pedal 84 fully to a bottom-of-clutch position, switch 90 shifts from the closed position illustrated in FIG. 3 to an open position, thereby interrupting power to supply line 252, placing transmission 14 in neutral and applying a bottom-of-clutch signal to controller 42.

As discussed above, each directional control valve included in valving 126 includes a solenoid coil that is energized to shift the corresponding valve, permitting pressurized fluid to flow to a clutch of transmission 14. The solenoid coils for valving 126 are illustrated schematically in FIG. 3. In the presently preferred embodiment, eight such solenoid coils, 258, 260, 262, 264, 266, 268, 270 and 272, are electrically coupled to supply line 252 for engaging clutches 154, 156, 202, 192, 194, master clutch 182, clutch 170 and reverse clutch 178, respectively. Two additional coils, 274 and 276 are coupled to supply line 254 for engaging clutches 172 and 174, respectively. Coils 258 through 276 are, in turn, coupled to solenoid driver circuits 278 in controller 42 which selectively couple the coils to a common ground line 280, thereby energizing the coil to shift an associated valve and engage a clutch. In the presently preferred embodiment, valve drivers 278 include on/off-type drivers 282, 284, 286, 288, 290 and 296, coupled to coils 258, 260, 262, 264, 266 and 272, respectively. Several pulse-width-modulated drivers 292, 294, 298 and 300, are provided for driving coils 268, 270, 274 and 276, respectively. It should be noted that in the present implementation of control circuit 38, only master clutch 182, engaged by coil 268 through pulse-width-modulated driver 294 is engaged and disengaged by modulation. Other pulse-width-modulated drivers 292, 298 and 300 either fully energize or fully de-energize their associated valve coils. However, the provision of these pulse-width-modulated drivers is preferred to permit future adaptation of controller 42 for additional clutch modulation tasks.

In addition to valve drivers 278, controller 42 includes an additional switching circuit 302 coupled to ground connection 256 from neutral latch circuit 112. Switching circuit 302 is electrically coupled to common ground line 280 and permits controller 42 to selectively unlatch neutral latch circuit 112, thereby interrupting power to supply lines 252 and 254, disabling valve coils 258 through 276 and placing transmission 14 in neutral. In normal operation, however, controller 42 maintains circuit 302 closed, thereby grounding connection 256.

It will be noted that valve coils 274 and 276 are coupled to power supply line 254, which receives electric power when key switch 70 is in a "run" position, energized even when vehicle 10 is in neutral or park. Thus, controller 42 may energize coils 274 and 276 to engage clutches 172 and 174 although the remainder of the valve solenoids are disabled. In the presently preferred embodiment, controller 42 engages clutches 172 and 174 when FNRP lever 72 is placed in its "neutral" or "park" position for more than 0.1 second, thereby locking intermediate transmission shaft 162 against rotation. Locking shaft 162 against rotation effectively defeats hydraulic drag within transmission 14 that might otherwise tend to transmit some torque through the transmission to one or more output shaft. The time delay in locking shaft 162 permits the vehicle operator to traverse the "neutral" and "park" positions quickly without engaging clutches 172 and 174. In addition, transmission 14 includes a locking pawl (not shown), spring biased into an engaged position wherein it blocks rotation of at least output shaft 58. During normal (i.e. non-parked) operation of transmission 14, the pawl is held in a non-engaged position by energizing park solenoid coil 236 via an appropriate control signal from controller 42. When FNRP lever 72 is placed in its "park" position, however, controller 42 de-energizes coil 236, thereby releasing the pawl and preventing rotation of the transmission output shaft.

As illustrated in FIG. 3, park switch 241, valve coils 258 through 276, and ground connection 256 are coupled to controller 42 through harness connectors 116 and 118. The connections illustrated in FIG. 3 represent those present when connectors 116 and 118 are mated, as for normal operation of transmission 14. Upon the occurrence of certain system failures, such as failure of controller 42, control system 38 may be placed in a "limp home" configuration by uncoupling connector 116 from connector 118 and mating connector 118 with limp home connector 120 in a manner generally known in the art. The circuit connections present in the limp home configuration of connectors 118 and 120 are those made by shifting the upper lines entering the box shown in broken lines in FIG. 3, to the fight one step. Thus, coils 260, 266, 274 and 276 make no connection in the limp home configuration, while coils 262 and 272 are coupled to a first alternative grounding line 304 and coils 258 and 264 are coupled to a second alternative grounding line 306. It should also be noted that in the limp home configuration, valve coils 268 and 270 are coupled directly to ground, resulting in engagement of clutch 170 and master clutch 182. In addition, ground line 256 from neutral latch circuit 112 is grounded in the limp home configuration, while parking switch 241 is coupled directly to limp home park relay circuit 238.

Alternative grounding lines 304 and 306 are coupled to reverse and forward limp home relay circuits 310 and 308, respectively. Forward limp home relay circuit 308 is, in turn, directly coupled to forward switch 243, while reverse limp home relay circuit 310 is directly coupled to reverse switch 244. With connectors 118 and 120 thus mated in the limp home configuration described above, forward limp home relay circuit 308 is closed by moving FNRP lever 72 to its forward position, thereby closing forward switch 243. Similarly, reverse limp home relay circuit 310 is closed by moving FNRP lever 72 to its reverse position, thereby closing reverse switch 244. Energizing forward limp home relay circuit 308 grounds line 306, thereby energizing coils 266 and 258, engaging clutches 172 and 156, and placing transmission 14 in the 8th forward gear. Energizing reverse limp home relay circuit 310 grounds line 304, thereby energizing coils 262 and 272, and placing transmission 14 in the 1st reverse gear. This limited limp home operation of transmission 14 permits an operator to transport vehicle 10 in the event of a system failure, including failure of controller 42.

It should be noted that limp home park relay circuit 238 is energized when connectors 118 and 120 are mated in the limp home configuration and FNRP lever 72 is placed in positions other than its "park" position. When energized, relay circuit 238 shift contacts 237, electrically connecting park solenoid coil 236 between power line 254 and ground, energizing coil 236 and thereby withdrawing the parking pawl from its engaged position to permit vehicle 10 to move. When FNRP lever 72 is moved to its "park" position, power is interrupted to circuit 238, releasing contact 237 to return to the position shown in FIG. 3 and de-energizing coil 236 to release the pawl.

As illustrated in FIGS. 3 and 4, signals from sensors 44, 46, 48, 50, 52, 86 and 233, and from switches 76, 78, 80, 82, 88 and 90 are applied to controller 42 via their respective communication links. Similarly, the states of FNRP lever and bump lever 74 are communicated to controller 42. In the presently preferred embodiment, controller 42 is a microprocessor-based digital controller including a signal processing circuit 314, typically configured through appropriate coding of a microprocessor, such as an Intel 80C198 microcontroller. Controller 42 further includes appropriate memory circuitry 316, which preferably includes electronically erasable programmable read only memory (EEPROM) and random access and read only memory (RAM and ROM) for storing a preset, cyclic transmission control routine implemented by signal processing circuit 314, calibration values for the various clutches and other calibrated components of control system 38, as well as various temporarily stored values used by controller 42, such as command values, sensed values and the like. A shift scheduling circuit 318, illustrated in FIG. 4 as separate from signal processing circuit 314 and memory circuit 316, but typically configured via coding within the microprocessor, functions with signal processing circuit 314 to schedule shifts into and out of gear ratios based upon the control routine executed by signal processing circuit 314.

Signal processing circuit 314 preferably includes an on-board analog-to-digital converter (not represented in FIG. 4) for converting input parameter signals directly to digital signals for processing. However, controller 42 will typically include interface circuits 320, 322, 324 and 326 for converting and conditioning the sensed and command signals produced by the system sensors and command devices into filtered signals and for isolating signal processing circuit 314 from power surges and the like. Moreover, controller 42 includes valve driver circuits 278, discussed above for converting control signals output by signal processing circuit 314 into drive signals for energizing valve coils 266 through 276. Neutral latch circuit 112 is also coupled to signal processing circuit 314, which monitors the state of circuit 112 and controls grounding of circuit 112 via driver 302. Display 92 is coupled to signal processing circuit 314 through an interface circuit 332. The particular configuration of interface circuits 320, 322, 324, 326 and 332 will vary depending upon the particular sensors, command devices and signal processing circuitry employed in the system. The construction and operation of such interface circuitry is well known to those skilled in the art.

In operation, sensors 44 through 52, 86 and 233 continuously apply their sensed parameter signals to interface circuit 320, which filters and converts these signals to a range and form usable by signal processing circuit 314. Similarly, command devices 72 through 82, 88 and 90 apply signals to signal processing circuit 314 via their respective interface circuits 324 and 326, signal processing circuit 314 typically accessing the various command signals periodically as required by the transmission control routine stored in memory circuit 316. When automatic/manual switch 76 is placed in its "manual" position, transmission 14 may be shifted upon direct command from the vehicle operator by manipulation of clutch pedal 84 and levers 72 and 74. When automatic/manual switch 76 is placed in its "automatic" position, however, signal processing circuit 314 cycles through the transmission control routine as accessed from memory circuit 316 and, based upon the input and command signals applied by the sensors and command devices, determines when and how transmission 14 is to be shifted between the gear ratios described above, as well as when portions of control system 38 should be disabled, such as by interrupting the ground to neutral latch circuit 112. As will be appreciated by those skilled in the art, memory circuit 316 stores as part of the control routine, a table of gear ratios available through particular combinations of transmission clutches as described above. Shifts selected by signal processing circuit 314 are based upon these preset combinations. The overall transmission control routine may include various subroutines for controlling transmission operation in specific situations, such as for ground-speed-matching as described below. Generally, however, the overall control routine permits modulated shifting, including modulated shuttle shifting, skip shifting and power shifting, all of which are techniques well known in the art.

Signal processing circuit 314 cooperates with shift scheduling circuit 318 to schedule the shifts (i.e. engagement and disengagement of combinations of clutches) identified by signal processing circuit 314. As mentioned above, in the presently preferred embodiment, signal processing circuit 314 and shift scheduling circuit 318 are configured in a programmed microprocessor, shift scheduling circuit 318 effectively being an aspect or subroutine of the overall control routine, adapted to schedule disengagement of "outgoing" clutches and engagement of "in-coming" clutches to obtain smooth transitions between gear ratios. Based upon this scheduling, signal processing circuit 314 generates appropriate control signals to energize and de-energize coils 266 through 276, and applies these control the coils through driver circuits 278 to execute the selected shifts.

In normal operation, a vehicle operator typically configures control system 38 for automatic or manual operation by manipulating automatic/manual switch 76. The operator may then preselect forward and reverse commanded gear ratios, which are displayed on display 92 as described below. In the preferred embodiment, these gear ratios may be preselected by the vehicle operator. Controller 42 will then schedule shifts to obtain the commanded gear ratio upon FNRP lever 72 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 92 will generally be engaged as the commanded gear ratio, unless changed by the operator. The operator may then increment or decrement the commanded gear ratio by moving bump lever 74 to its "increment" or "decrement" position. Bump lever 74 may be held in either position to increment or decrement the commanded gear ratio through more than one ratio. Bump lever 74 is released once the desired commanded gear ratio is reached.

Figure 5:
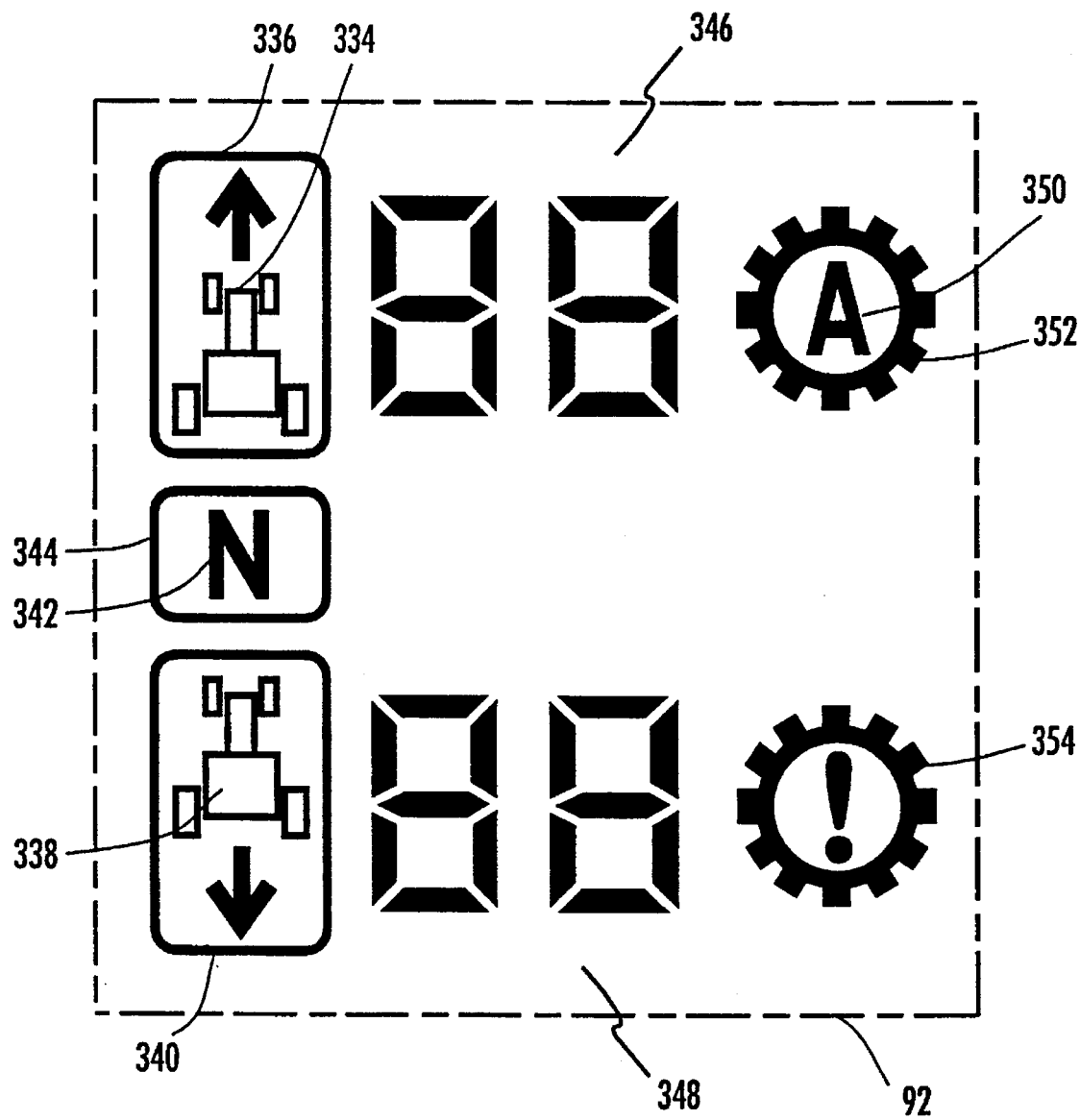
FIG. 5 illustrates a portion of a control panel display in accordance with the presently preferred embodiment, indicating information available to the vehicle operator during operation of the control system.

In addition to applying control signals to coils to engage and disengage transmission clutches, signal processing circuit outputs signals to display 92 to provide the vehicle operator with information on the operation of transmission 14 and controller 42. In the presently preferred embodiment, as illustrated in FIG. 5, display 92 includes a series of icons for conveying information to the vehicle operator. These icons include a forward icon 334, a forward box 336, a reverse icon 338 and reverse box 340, and a neutral icon 342 and neutral box 344. In addition, display 92 includes forward digits 346 and reverse digits 348, an automatic icon 350 surrounded by a transmission icon 352, and a diagnostics icon 354. In the preferred embodiment, the forward, reverse, neutral and transmission icons, 334, 338, 342 and 352, respectively, are continuously visible after vehicle 10 is powered up. When FNRP lever 72 is placed in its "forward," "reverse" or "neutral" position, thereby closing forward, reverse or neutral switches, 243, 244 or 242, respectively, the corresponding box icon 336, 338 or 344 is illuminated, indicating the then current state of transmission 14. As described above, control system 38 places transmission 14 in a neutral condition upon start up, resulting in illumination of neutral box 344 until forward or reverse gear engagement. When automatic/manual switch 76 is placed in its "automatic" position, permitting controller 42 to control engagement and disengagement of transmission 14 in accordance with the particular routine stored in memory circuit 316, automatic icon 350 is illuminated. In normal operation, forward and reverse digits 346 and 348 display commanded forward and reverse gear ratios into which transmission 14 will be shifted by controller 42 upon movement of FNRP lever 72 to its "forward" or "reverse" positions as described above. However, digit displays 346 and 348 preferably permit additional information to be conveyed to the operator. For example, when FNRP lever 72 is placed in its "park" position, digit display 348 indicates the letter "P." In addition, digit displays 346 and 348 are preferably used to convey error messages for system diagnostics. When controller 42 determines that a default condition is present in system 38, diagnostic icon 354 becomes visible. Such fault conditions may include, by way of example, failure of a solenoid coil or valve driver, a difference between a detected clutch pressure and the state of a solenoid coil, open circuits and the like. Moreover, controller 42 preferably includes a diagnostics routine, of a type generally known in the art, that permits error codes indicative of such failures to be accessed from memory circuit 316. Such error codes may be conveniently displayed in two-digit code form on digit displays 346 and 348.

In accordance with one aspect of control system 38, controller 42 implements a ground-speed-matching routine designed to engage a ground-speed-matched gear ratio in appropriate situations. Generally, in accordance with this ground-speed-matching routine controller 42 monitors signals representative of the ground speed of vehicle 10 and of the output speed of engine 12, and generates a speed ratio value representative of the current ratio of these speeds. This speed ratio is compared to the predetermined speed ratios stored in memory circuit 316 following operator induced disengagement of transmission 14. Following an operator induced re-engagement signal, control system 38 engages either the gear ratio most closely matching the speed ratio, the commanded gear ratio which was engaged prior to transmission disengagement, or a default gear ratio, depending upon the vehicle speed and upon comparisons between the ratios as described below.

Figure 6:
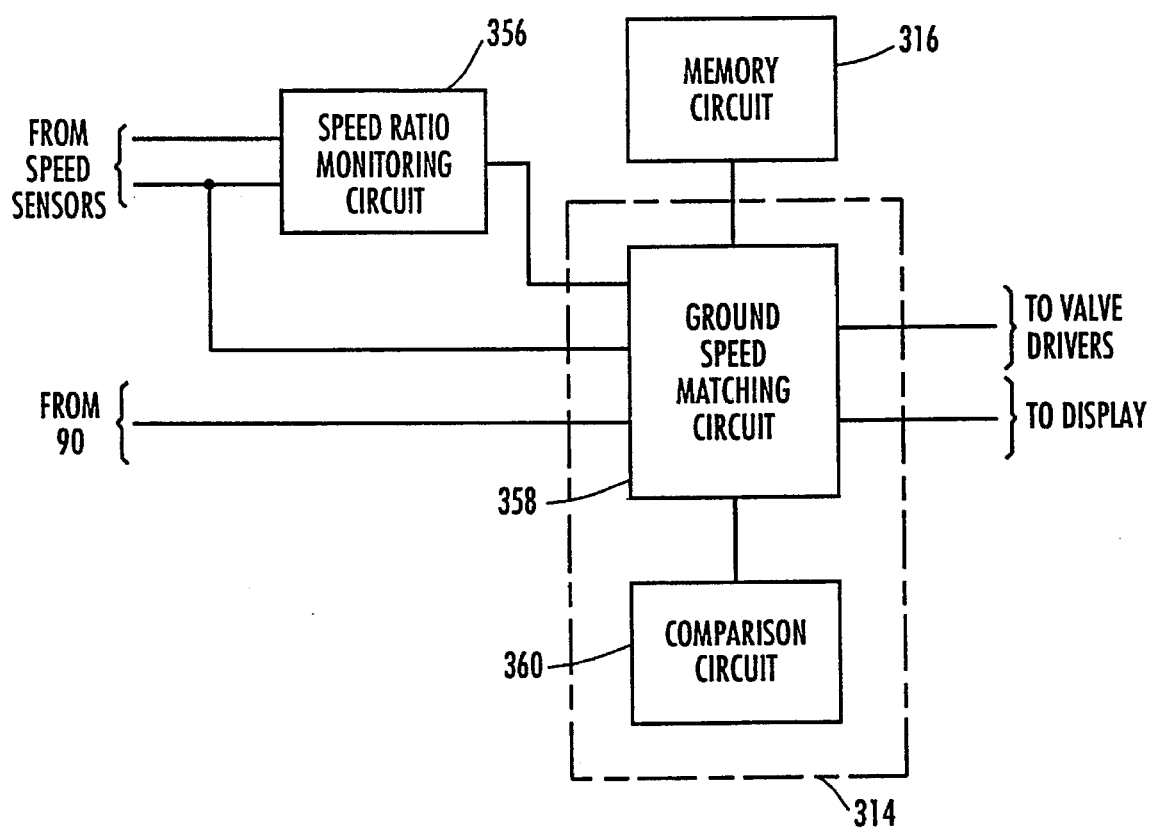
FIG. 6 is a signal flow diagram generally illustrating the flow of signals processed by the control circuit of the system shown in FIG. 4 for engaging the work vehicle transmission of FIG. 2 in a ground-speed-matching control routine in accordance with the invention.
Figure 7A:
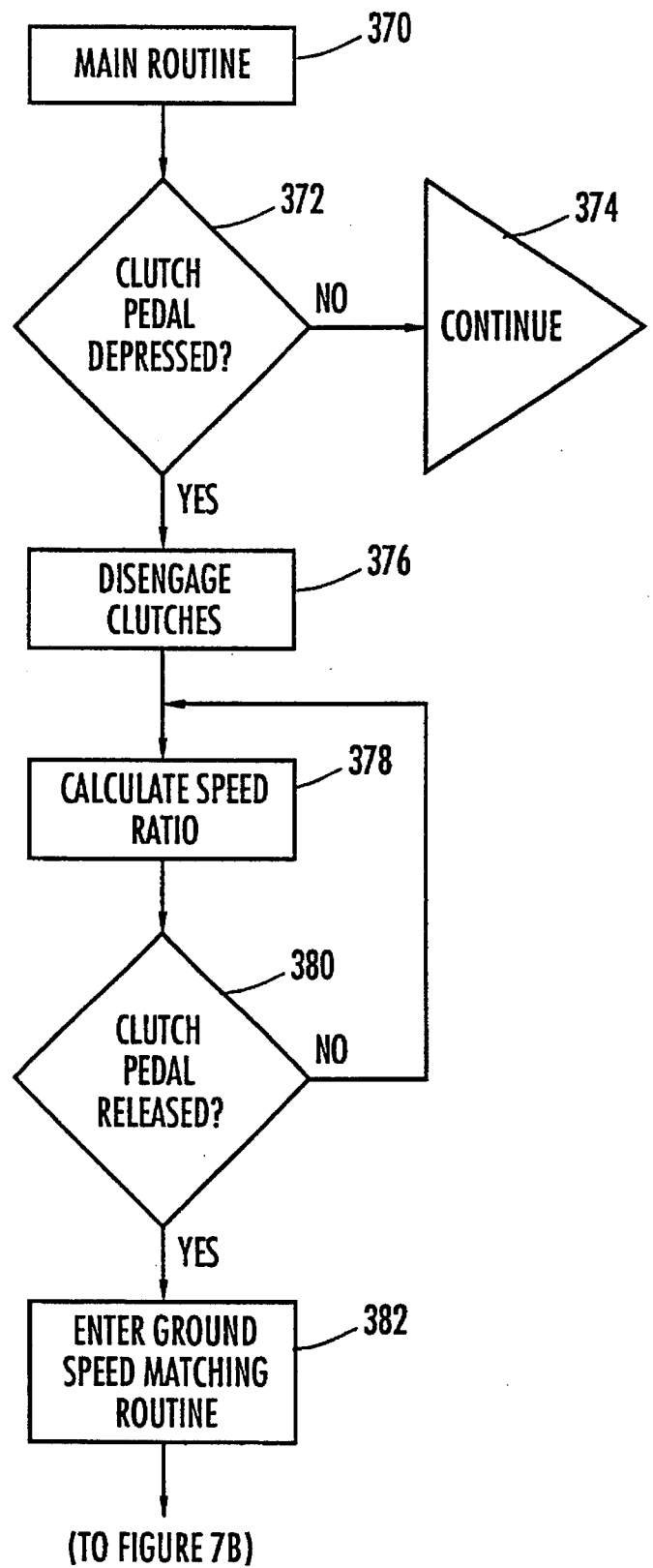
FIGS. 7A AND 7B are flow charts depicting the exemplary steps in control logic implemented by the control system of FIGS. 4 and 6 in a ground-speed-matching control routine in accordance with the invention.
Figure 7B:
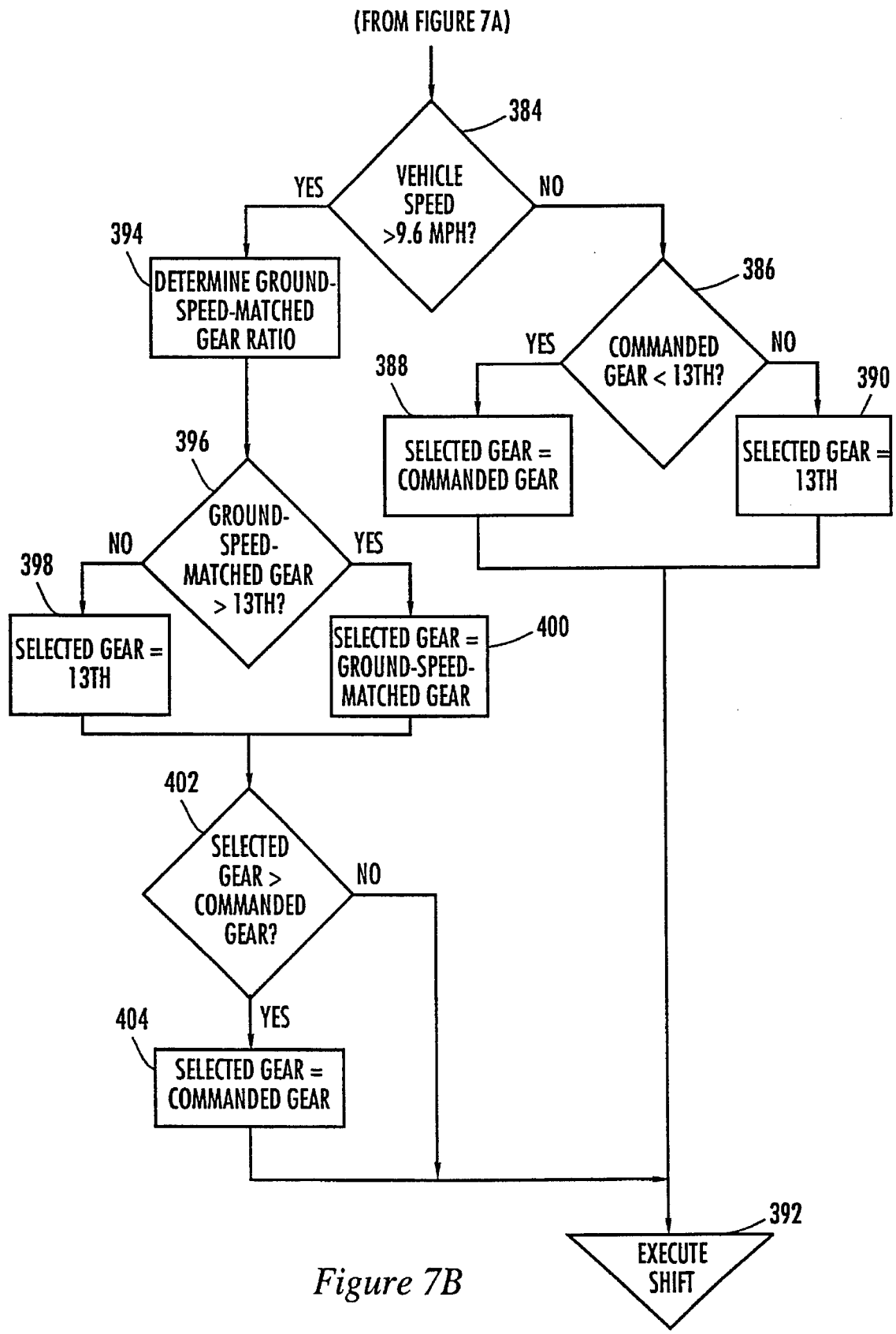

FIG. 6 illustrates, generally, the functional circuitry used to implement the ground-speed-matching routine, while FIGS. 7A and 7B depict exemplary steps in control logic for implementing the routine. Although the functional circuits represented in FIG. 6 may be defined through the use of analog circuit elements, they are preferably configured through appropriate coding of controller 42, and particularly of signal processing circuit 314. As shown in FIG. 6, the ground-speed-matching routine employs a speed ratio monitoring circuit 356, a ground-speed-matching circuit 358 and a comparison circuit 360. Speed ratio monitoring circuit 356 preferably receives signals from speed sensors 44 and 46, representative of the output speed of engine 12 and the output speed of transmission 14, respectively. As mentioned above, the transmission output speed is used in the ground-speed-matching routine as an indication of the ground speed of vehicle 10. Thus, where a true ground speed-related signal is available from another sensor, such as directly from ground speed sensor 52, this signal may be substituted for the signal from sensor 46 for the purposes of the ground-speed-matching routine. Monitoring circuit 356 generates a speed ratio signal representative of the ratio of the transmission output speed to the transmission input speed based upon the sensed speed signals, and applies this speed ratio signal to ground-speed-matching circuit 358. Ground-speed-matching circuit 358 also receives as inputs the signal representative of the true ground speed of vehicle 10, as well as the signal representative of the current state of bottom-of-clutch switch 90. Upon invocation of the ground-speed-matching routine, as described below, ground-speed-matching circuit 358 calls upon comparison circuit 360 to compare the speed ratio signal to the gear ratios stored in memory circuit 316. In the preferred embodiment, ground-speed-matching circuit 358 also calls upon comparison circuit 360 to perform several other speed and speed ratio comparisons as discussed below. Based upon these comparisons, ground-speed-matching circuit 358 selects a gear ratio to be engaged and cooperates with shift scheduling circuit 318 to schedule engagement of the selected gear ratio.

FIGS. 7A and 7B represent typical control logic for carrying out the ground-speed-matching routine. As represented by block 370, controller 42 cycles through the main transmission control routine stored in memory circuit 316, in which signal processing circuit 314 acts upon input signals for shifting transmission 14 into desired gear ratios as described above. In particular, controller 42 cyclically checks the status of the various inputs and enters subroutines or similar logical processes based upon these inputs. As indicated at step 372, one of the inputs monitored by controller 42 is the state of bottom-of-clutch switch 90. So long as clutch pedal 84 remains above its bottom-of-clutch position, the main transmission control routine continuously cycles, as indicated at step 374. However, when clutch pedal 84 is sufficiently depressed to open bottom-of-clutch switch 90, power is interrupted to power supply line 252 (see FIG. 3), disengaging the transmission clutches, as indicated at step 376. At step 378, controller 42 treats this operator-induced disengaging event as a flag and commands speed ratio monitoring circuit 356 to begin cyclically calculating the speed ratio signal between the vehicle ground speed and the engine output speed as discussed above. It should be noted that, throughout these steps and the steps that follow, signal processing circuit 314 may actually continue cycling through other monitoring and processing steps as part of the overall transmission control routine. Moreover, in lieu of beginning the speed ratio calculation after operator-induced transmission disengagement, controller 42 may be configured to continuously monitor the vehicle ground speed and engine speed, and to calculate the speed ratio for use elsewhere in the main control routine.

While cyclically calculating the speed ratio signal, controller 42 monitors the status of bottom-of-clutch switch 90. As indicated at step 380, if controller 42 does not detect a change in the state of switch 90, indicating that clutch pedal 84 has been released, signal processing circuit 314 returns to step 378 and continues to monitor the speed signals and to calculate the speed ratio. If controller 42 does detect that clutch pedal has been raised, this operator-induced transmission re-engagement event triggers signal processing circuit 314 to enter into a ground-speed-matching routine at step 382.

FIG. 7B illustrates generally typical steps in control logic for implementing the ground-speed-matching routine. At step 384 ground-speed-matching circuit 358 compares the current vehicle speed, as detected by sensor 52 (or as related to the speed sensed by sensor 46) to a predetermined vehicle speed threshold, such as 9.6 miles per hour. This threshold speed is considered the minimum ground-speed-matching speed. If the vehicle speed is not higher than the threshold speed, signal processing circuit 314 compares the commanded gear ratio to a default gear ratio, such as 13th gear, considered the minimum ground-speed-matched gear ratio. As noted above, the commanded gear ratio is the ratio in which transmission 14 was engaged prior to the disengagement event at step 372. If the commanded gear ratio is lower than the default gear ratio, signal processing circuit 314 selects the commanded gear ratio as the gear ratio to be engaged, as indicated at step 388. If, however, the commanded gear ratio is not less than the default gear ratio, signal processing circuit 314 selects the default gear ratio at step 390. Once either the commanded gear ratio or the default gear ratio is selected, signal processing circuit proceeds to step 392 where, in cooperation with shift scheduling circuit 318, control signals are generated for executing engagement of clutches corresponding to the selected gear ratio in a manner well known in the art.

If, at step 384, signal processing circuit 314 finds the vehicle speed is greater than the threshold speed, ground-speed-matching circuit 358 proceeds to step 394, where the speed ratio signal is compared to the gear ratios stored in memory circuit 316 and the gear ratio most closely matching the speed ratio signal is selected as the ground-speed-matched gear ratio. At step 396, comparison circuit 360 then compares the ground-speed-matched gear ratio to the minimum ground-speed-matched gear ratio, such as 13th gear. If the ground-speed-matched gear is not greater than the minimum ground-speed-matched gear ratio, ground-speed-matching circuit 358 selects the minimum ground-speed-matched gear ratio, as indicated at step 398. If, however, the ground-speed-matched gear ratio is greater than the minimum ground-speed-matched gear ratio, the ground-speed-matched gear ratio is selected at step 400. From step 400, ground-speed-matching circuit 358 compares the selected gear ratio to the last commanded gear ratio at step 402. If the selected gear ratio is greater than the commanded gear ratio, the selected gear ratio is set equal to the commanded gear ratio at step 404. Following step 404, or if the selected gear ratio is not greater than the commanded gear ratio at step 402, signal processing circuit 314 proceeds to step 392 where a shift to the selected gear ratio is scheduled and executed as discussed above.

It should be noted that the ground-speed-matching procedure described above effectively re-engages the last commanded gear ratio in situations where the ground-speed-matched gear ratio is greater than the last commanded gear ratio, thus avoiding inadvertent shifting into a higher gear ratio following a period of coasting with clutch pedal 84 depressed. It should be further noted that the control logic discussed above refers to ground-speed-matching in forward gear ratios only. However, in the presently preferred embodiment, similar control logic is implemented for ground-speed-matching in reverse gear ratios as well as in both forward and reverse creeper gear ratios. For example, in a particularly preferred embodiment, the threshold speed employed at step 384 is 6.9 miles per hour for reverse ground-speed-matching and the minimum ground-speed-matching gear ratio employed at steps 386, 390, 396 and 398 is the 4th reverse gear ratio. Similarly, the threshold speeds in forward and reverse creeper gears is 2.1 and 0 miles per hour, respectively, and the minimum ground-speed-matching gear ratios are the 6th forward creeper gear ratio and the 2nd reverse creeper gear ratio. Moreover, the conversion of the flow charts of FIGS. 7A and 7B into standard code to be stored in memory circuit 316 and implemented by signal processing circuit 314, or similar digital processing circuitry will be evident to those with ordinary skill in the art.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

I claim:

1. A control system for a transmission in a vehicle including an engine and driven wheels, the transmission being coupled between the engine and the driven wheels and including a plurality of gears and associated clutches, the clutches being engageable in predetermined combinations by an actuating circuit to define transmission gear ratios between an output speed of the engine and an output speed of the transmission, the control system comprising:

a speed ratio monitoring circuit including first and second sensors for sensing parameters indicative of vehicle ground speed and of engine output speed, respectively;

a gear ratio command circuit including an operator movable input device for commanding a desired gear ratio, the command circuit generating a command gear signal representative of a gear ratio commanded via the input device;

a memory circuit coupled to the gear ratio command circuit for storing the command gear signal; and a control circuit coupled to the speed ratio monitoring circuit and to the memory circuit, the control circuit engaging the commanded gear ratio prior to an operator-induced disengaging event, generating a speed ratio signal representative of a ratio between the vehicle ground speed and the engine output speed, comparing the speed ratio signal to predetermined gear ratios, identifying a ground-speed-matched gear ratio based upon the speed ratio represented by the speed ratio signal, comparing the ground-speed-matched gear ratio to the commanded gear ratio and, after an operator-induced re-engaging event, selecting either the ground-speed-matched gear ratio or the commanded gear ratio based upon a predetermined relationship therebetween, and generating control signals for engaging clutches corresponding to the selected gear ratio and applying the control signals to the actuating circuit to engage the selected gear ratio.

2. The control system of claim 1, wherein the disengaging event occurs when an operator depresses a clutch pedal and the re-engaging event occurs when the operator releases the clutch pedal.

3. The control system of claim 1, wherein the gear ratios are reverse gear ratios.

4. The control system of claim 1, further including an operator operable switching device coupled to the control circuit, the switching device generating and applying signals to the control circuit for selectively disengaging and re-engaging the transmission, the control circuit generating the control signals to engage clutches corresponding to the selected gear ratio after receiving a transmission re-engaging signal from the switching device.

5. The control system of claim 4, wherein the control circuit is configured to engage the commanded gear prior to receiving a disengaging signal from the switching device.

6. The control system of claim 1, wherein the control circuit compares the ground-speed-matched gear ratio to a predetermined gear ratio prior to comparing the ground-speed-matched ratio to the commanded gear ratio.

7. A control system for a transmission in a vehicle including an engine and driven wheels, the transmission being coupled between the engine and the driven wheels and including a plurality of gears and associated clutches, the clutches being engageable in predetermined combinations by an actuating circuit to define transmission gear ratios between an output speed of the engine and an output speed of the transmission, the control system comprising:

a ground speed monitoring circuit detecting a parameter indicative of vehicle ground speed and generating a ground speed signal representative thereof;

a comparison circuit coupled to the ground speed monitoring circuit, the comparison circuit comparing the ground speed represented by the ground speed signal to a predetermined threshold ground speed; and a control circuit coupled to the comparison circuit and to the ground speed monitoring circuit, the control circuit executing a ground-speed-matching gear selection routine when the ground speed and the threshold ground speed satisfy a predetermined relationship and executing an alternative gear ratio selection routine when the predetermined relationship is not satisfied, the control circuit selecting a gear ratio in either the ground-speed-matching gear selection routine or the alternative gear selection routine and generating control signals for engaging clutches corresponding to the selected gear ratio and applying the control signals to the actuating circuit to engage the selected gear ratio.

8. The control system of claim 7, wherein the gear ratios are reverse gear ratios.

9. The control system of claim 7, wherein the control circuit enters the ground-speed-matching gear selection routine when the ground speed is above a threshold ground speed.

10. The control system of claim 7, further comprising a gear ratio command circuit including an operator movable input device for commanding a desired gear ratio, and a memory circuit coupled to the gear ratio command circuit for storing the command gear signal, the control circuit comparing the selected gear ratio to the commanded gear ratio and generating the control signals for engaging either the selected gear ratio or the commanded gear ratio based upon a predetermined relation ship therebetween.

11. The control system of claim 10, wherein the control circuit generates the control signals for engaging the commanded gear ratio when the commanded gear ratio is lower than the selected gear ratio.

12. The control system of claim 7, wherein in the ground-speed-matching gear selection routine, the control circuit compares a ground-speed-matched gear ratio to a predetermined gear ratio, and selects either the ground-speed-matched gear ratio or the predetermined gear ratio depending upon a predetermined relationship therebetween.

13. The control system of claim 12, wherein the control circuit selects the ground-speed-matched gear ratio when the ground-speed-matched gear ratio is greater than the predetermined gear ratio.

14. The control system of claim 7, further comprising a gear ratio command circuit including an operator movable input device for commanding a desired gear ratio, and a memory circuit coupled to the gear ratio command circuit for storing the command gear signal, and wherein in the alternative gear selection routine, the control circuit compares the commanded gear ratio to a predetermined gear ratio and generates the control signals to engage either the commanded gear ratio or the predetermined gear ratio based upon a predetermined relationship therebetween.

15. A control system for a transmission in a vehicle including an engine and driven wheels, the transmission being coupled between the engine and the driven wheels and including a plurality of gears and associated clutches, the clutches being engageable in predetermined combinations by an actuating circuit to define transmission gear ratios between an output speed of the engine and an output speed of the transmission, the control system comprising:

a speed ratio monitoring circuit including first and second sensors for sensing parameters indicative of vehicle ground speed and of engine output speed, respectively;

a memory circuit for storing a predetermined gear ratio signal representative of a predetermined gear ratio; and a control circuit coupled to the speed ratio monitoring circuit and to the memory circuit, the control circuit generating a speed ratio signal representative of a ratio between the vehicle ground speed and the engine output speed, comparing the speed ratio signal to predetermined gear ratios, identifying a ground-speed-matched gear ratio based upon the speed ratio represented by the speed ratio signal, comparing the ground-speed-matched gear ratio to the predetermined gear ratio and selecting either the ground-speed-matched gear ratio or the predetermined gear ratio based upon a predetermined relationship therebetween, and generating control signals for engaging clutches corresponding to the selected gear ratio and applying the control signals to the actuating circuit to engage the selected gear ratio.

16. The control system of claim 15, wherein the gear ratios are reverse gear ratios.

17. The control system of claim 15, further comprising a gear ratio command circuit including an operator movable input device for commanding a desired gear ratio, and a memory circuit coupled to the gear ratio command circuit for storing the command gear signal, and wherein the control circuit comparing the selected gear ratio to the commanded gear ratio and generating the control signals for engaging either the selected gear ratio or the commanded gear ratio based upon a predetermined relationship therebetween.

18. The control system of claim 17, wherein the control system engages the commanded gear ratio when the commanded gear ratio is less than the selected gear ratio.

19. A method for shifting a transmission in a vehicle including an engine and driven wheels, the transmission being coupled between the engine and the driven wheels and including a plurality of gears and associated clutches, the clutches being engageable in predetermined combinations by an actuating circuit to define transmission gear ratios between an output speed of the engine and an output speed of the transmission, the vehicle further including first and second sensors for detecting parameters indicative of vehicle ground speed and of engine output speed, respectively, and generating signals representative thereof, an operator movable command device for setting a commanded gear ratio and a control circuit coupled to the sensors, the command device and the actuating circuit, the method comprising the steps of:

(a) determining a speed ratio of the parameter indicative of vehicle ground speed to the parameter indicative of engine output speed;

(b) identifying a ground-speed-matched gear ratio based upon the speed ratio;

(c) comparing the ground-speed-matched gear ratio to the commanded gear ratio and selecting the ground-speed-matched gear ratio or the commanded gear ratio based upon a predetermined relationship therebetween; and (d) generating control signals and applying the control signals to the actuating circuit to engage the gear ratio selected in step (c).

20. The method of claim 19, wherein the parameter indicative of vehicle ground speed is detected from the rotational speed of a transmission output shaft.

21. The method of claim 19, wherein at step (c) the commanded gear ratio is selected when the commanded gear ratio is less than the ground-speed-matched gear ratio.

22. The method of claim 19, wherein step (a) is performed cyclically by the control circuit and steps (b) through (d) are performed after the control circuit receives an operator induced transmission re-engagement signal.

23. The method of claim 19, wherein prior to step (c) the ground-speed-matched gear ratio is compared to a predetermined minimum ground-speed-matched gear ratio and is set equal to the minimum ground-speed-matched gear ratio when the minimum ground-speed-matched gear ratio is lower than the ground-speed-matched gear ratio.

24. The method of claim 19, wherein prior to step (c) vehicle ground speed is compared to a threshold speed and the ground-speed-matched gear ratio is set equal to a minimum ground-speed-matched gear ratio when the vehicle ground speed is less than the threshold speed.

* * * * *